United States Patent
Weinberg

(10) Patent No.: US 10,150,601 B2
(45) Date of Patent: Dec. 11, 2018

(54) ERGONOMIC LEAKPROOF TRAVEL CONTAINER

(71) Applicant: Francine Weinberg, New York, NY (US)

(72) Inventor: Francine Weinberg, New York, NY (US)

(*) Notice: Subject to any disclaimer, the term of this patent is extended or adjusted under 35 U.S.C. 154(b) by 0 days.

(21) Appl. No.: 15/612,927

(22) Filed: Jun. 2, 2017

(65) Prior Publication Data
US 2017/0349344 A1    Dec. 7, 2017

Related U.S. Application Data

(63) Continuation-in-part of application No. 29/567,281, filed on Jun. 7, 2016, now Pat. No. Des. 805,363.

(51) Int. Cl.
| | |
|---|---|
| *B65D 53/00* | (2006.01) |
| *B65D 25/04* | (2006.01) |
| *B65D 25/24* | (2006.01) |
| *B65D 43/16* | (2006.01) |
| *B65D 43/22* | (2006.01) |
| *B65D 51/24* | (2006.01) |
| *B65D 85/72* | (2006.01) |
| *B65D 45/18* | (2006.01) |
| *A47J 47/06* | (2006.01) |

(52) U.S. Cl.
CPC .............. *B65D 53/00* (2013.01); *A47J 47/06* (2013.01); *B65D 25/04* (2013.01); *B65D 25/24* (2013.01); *B65D 43/164* (2013.01); *B65D 43/22* (2013.01); *B65D 45/18* (2013.01); *B65D 51/245* (2013.01); *B65D 51/247* (2013.01); *B65D 85/72* (2013.01)

(58) Field of Classification Search
CPC ...... B65D 53/00; B65D 45/18; B65D 51/245; B65D 85/72; B65D 51/247; B65D 43/164; B65D 25/24; B65D 25/04; B65D 43/22
USPC ....... 206/581; 220/531, 4.23, 339, 810, 523, 220/526, 554
See application file for complete search history.

(56) References Cited

U.S. PATENT DOCUMENTS

| | | | |
|---|---|---|---|
| 5,090,572 A | | 2/1992 | DeRoseau |
| 5,415,309 A | | 5/1995 | Wang |
| 5,443,174 A | * | 8/1995 | Bauer ................ B65D 17/4011 220/212 |
| 5,638,957 A | * | 6/1997 | Brasier ................ A61F 13/551 206/581 |

(Continued)

*Primary Examiner* — Kareen K Thomas
(74) *Attorney, Agent, or Firm* — Christopher Pilling

(57) ABSTRACT

An ergonomic leakproof travel container comprising a body member having a front side, a back side, and a continuous sidewall, wherein the continuous sidewall has an outer surface and inner surface forming a hollow interior; a first lid member hingedly attached to the body member via a first hinge member; a second lid member independent from the first lid member, wherein the second lid member is hingedly attached to the body member via the first hinge member, a chambered storage insert sized and shaped to fit in the hollow interior; a latch member attached to a second hinge member on the front side, wherein the latch member is configured to secure the first lid and second lid in a closed position; a first gasket positioned between the body member and the second lid creating a first leakproof seal; and a second gasket positioned between the chambered storage insert and the second lid creating a second leakproof seal.

20 Claims, 11 Drawing Sheets

(56) References Cited

U.S. PATENT DOCUMENTS

| | | | | |
|---|---|---|---|---|
| 5,705,212 | A * | 1/1998 | Atkinson | B65D 51/247 206/542 |
| 6,003,710 | A * | 12/1999 | Huang | B65D 51/246 215/228 |
| 6,076,698 | A * | 6/2000 | Magidson | B65D 75/225 220/4.03 |
| 6,105,767 | A * | 8/2000 | Vasudeva | B25H 3/023 206/349 |
| 6,604,646 | B2 | 8/2003 | Torniainen et al. | |
| D547,124 | S * | 7/2007 | Peretz | D7/505 |
| 7,823,743 | B2 * | 11/2010 | McKahan | B65D 71/20 220/212 |
| 7,971,747 | B2 * | 7/2011 | Blomdahl | B65D 51/247 220/212 |
| 8,220,625 | B2 * | 7/2012 | Michaels | A45C 11/24 206/233 |
| 8,313,001 | B1 * | 11/2012 | Reid | B65D 51/20 215/228 |
| 8,727,149 | B1 * | 5/2014 | Reid | B65D 41/26 215/228 |
| 2009/0026209 | A1 * | 1/2009 | Huntington | A61F 13/551 220/500 |

* cited by examiner

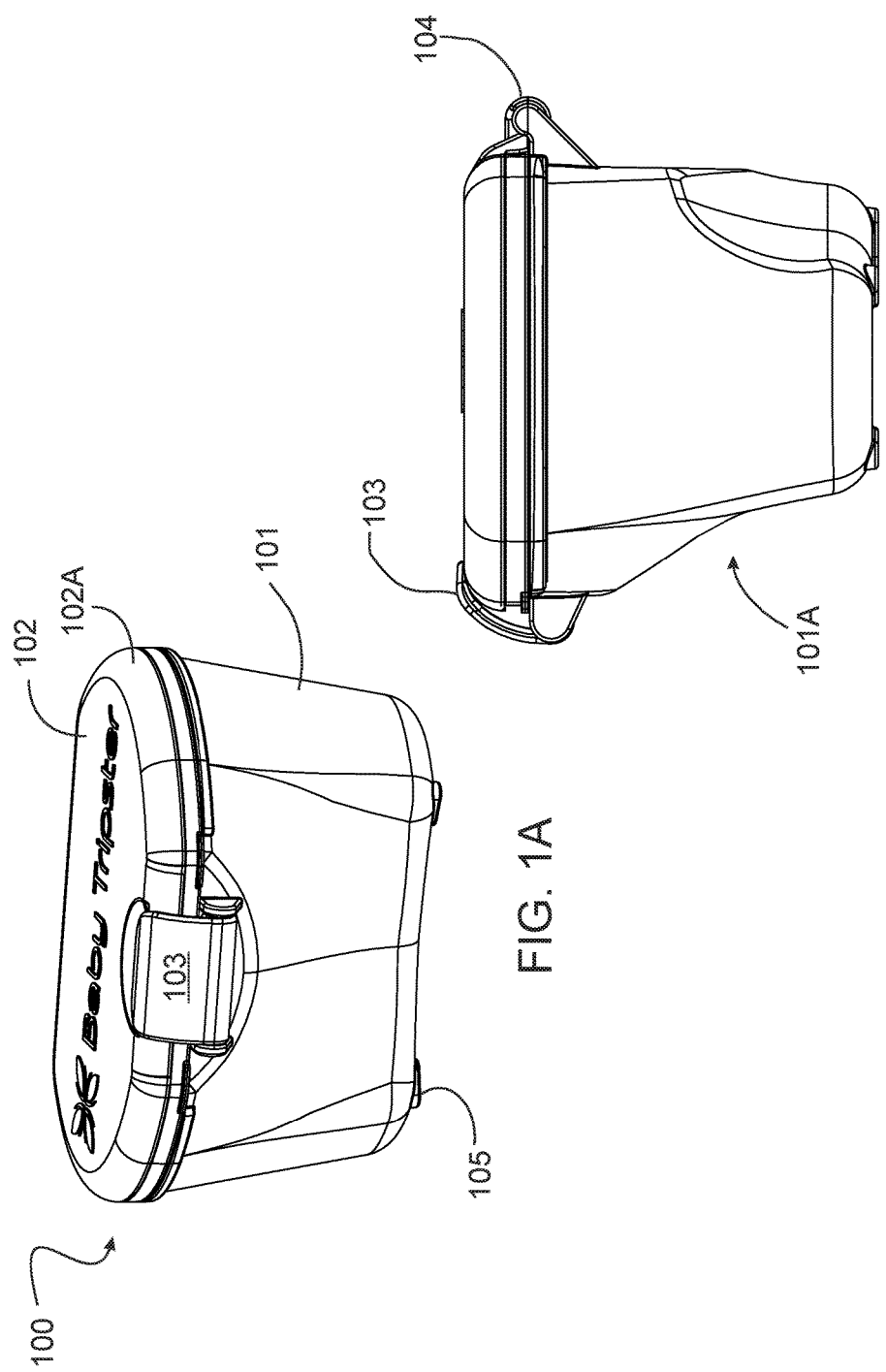

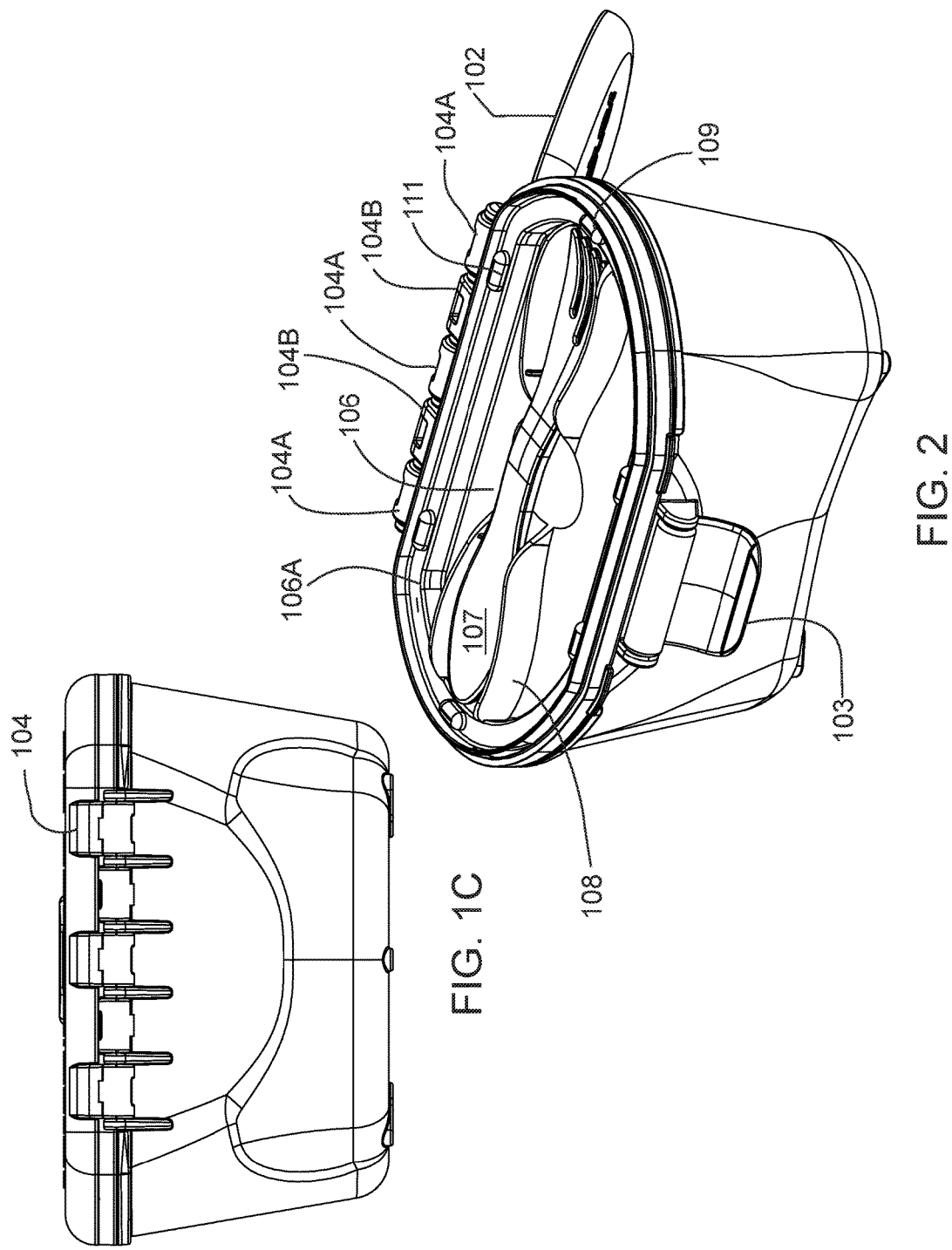

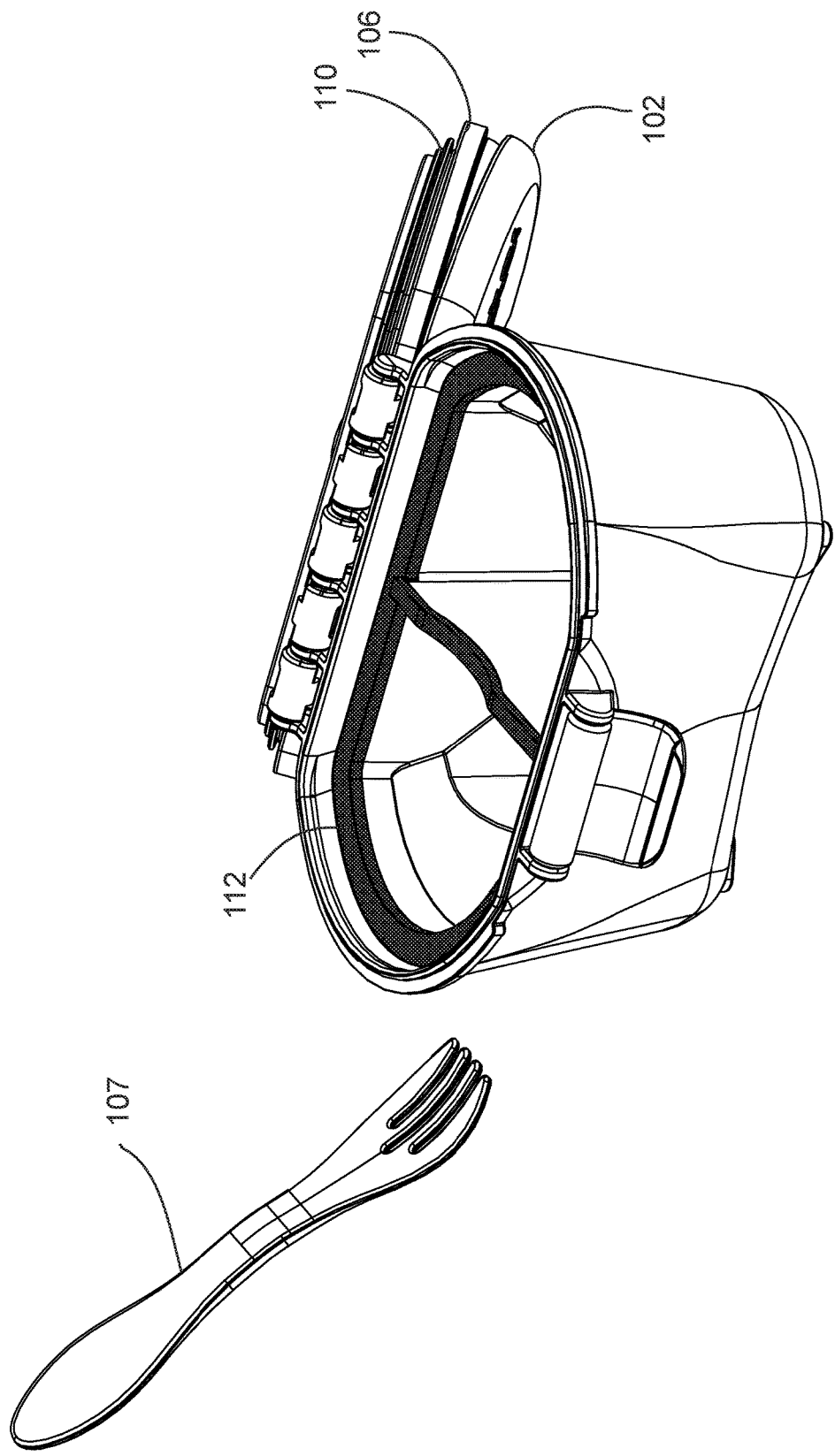

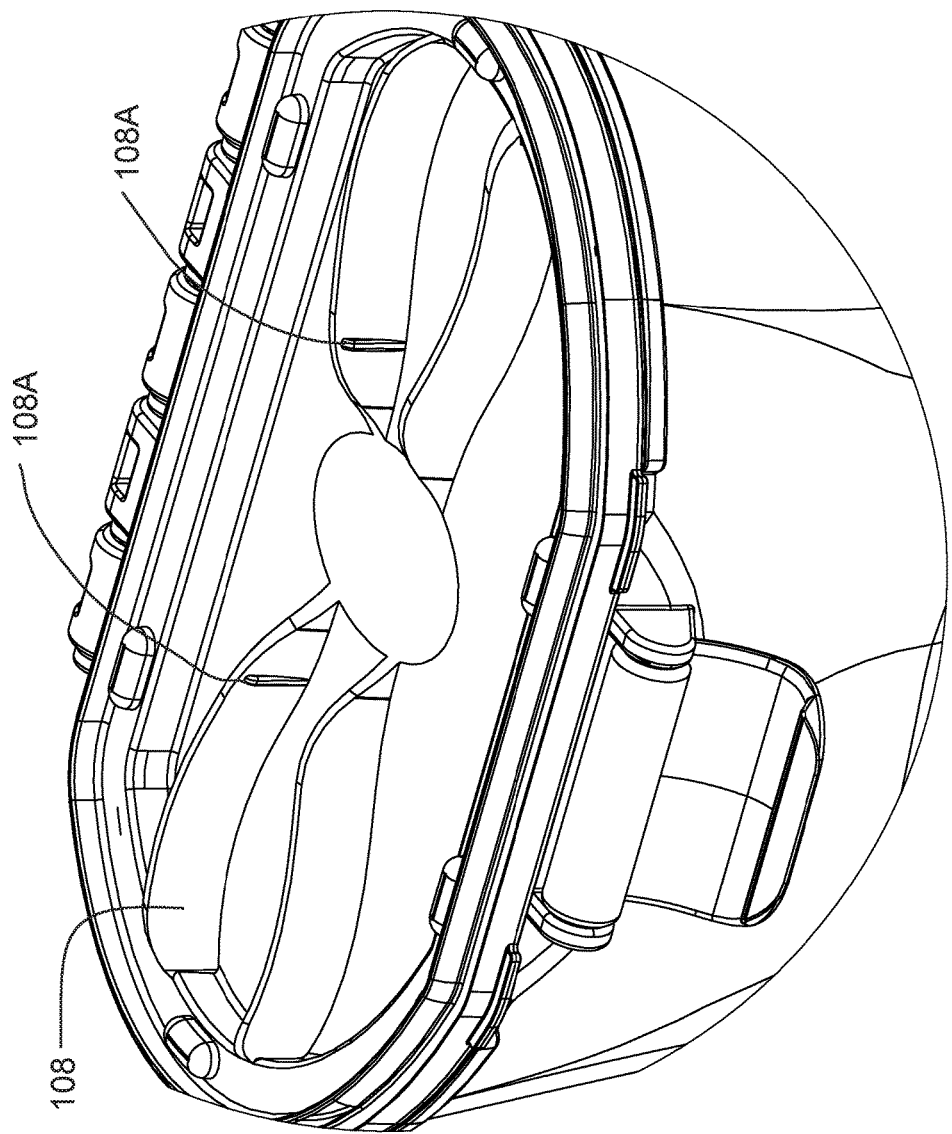

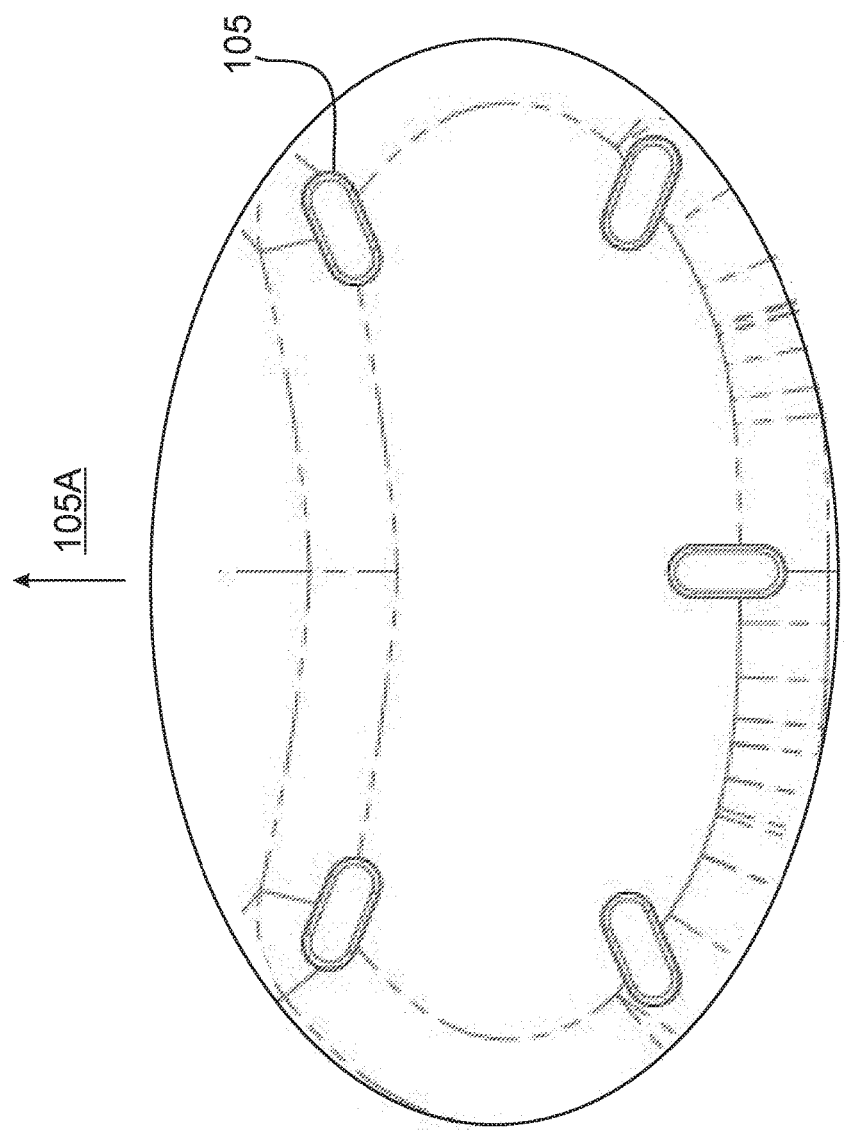

ERGONOMIC LEAKPROOF TRAVEL CONTAINER

CROSS-REFERENCE TO RELATED APPLICATIONS

The present application is a continuation-in-part application to U.S. Design patent application Ser. No. 29/567,281, filed on Jun. 7, 2016 entitled "Container", the disclosure of which is hereby incorporated in its entirety at least by reference.

BACKGROUND OF THE INVENTION

1. Field of the Invention

The present invention generally relates to containers, but more particularly to an ergonomic leakproof travel container.

2. Description of Related Art

When traveling, containers are beneficial for storing foods as well as being more environmentally friendly compared to plastic storage bags. Further, when a user wishes to store a liquid or a liquid/solid mixture, plastic storage bags may leak. Baby feeding containers are a typical and useful application of the art. Babies and infants alike eat several times a day and food is necessary when traveling away from home. As well known, most baby food is in puree form and a leakproof container is necessary for this type of food storage. Also, in most situations and especially in regards to small infants and babies, the child is held in one hand and fed with the other requiring the need for one-hand feeding. Consequently, there is a need for an ergonomic leakproof travel container facilitating a one-hand feeding method.

BRIEF SUMMARY OF THE INVENTION

In one embodiment of the present invention an ergonomic leakproof travel container is provided comprising a body member having a front side, a back side, and a continuous sidewall, wherein the continuous sidewall has an outer surface and inner surface forming a hollow interior; a first lid member hingedly attached to the body member via a first hinge member; a second lid member independent from the first lid member, wherein the second lid member is hingedly attached to the body member via the first hinge member, a chambered storage insert sized and shaped to fit in the hollow interior; a latch member attached to a second hinge member on the front side, wherein the latch member is configured to secure the first lid and second lid in a closed position; a first gasket positioned between the body member and the second lid creating a first leakproof seal; and a second gasket positioned between the chambered storage insert and the second lid creating a second leakproof seal.

In another aspect of the invention an ergonomic leakproof travel container is provided, comprising a body member having a front side, a back side, and a continuous sidewall having a first outer surface and a first inner surface forming a hollow interior, the continuous sidewall including a rim adjacent to a top portion of the inner surface, wherein the front side includes an ergonomic concave portion configured to be positioned in a hand of a user during use; a first lid member hingedly attached to the body member via a first hinge member; a second lid member including a flange portion and a lower rim, the flange portion creating a cavity having an inner horizontal surface and an inner vertical surface, wherein the second lid member is independent from the first lid member and hingedly attached to the body member via the first hinge member; a chambered storage insert having a second continuous sidewall including a second outer surface, a second inner surface, and a top surface, the chambered storage insert having at least one divider forming at least two chambers, wherein the chambered storage insert is sized and shaped to press fit in the hollow interior; a latch member attached to a second hinge member on the front side, wherein the latch member is configured to secure the first lid and second lid in a closed position; a first gasket having a first leakproof seal between the rim and the inner horizontal surface and a second leakproof seal between the first inner surface and the inner vertical surface; and a second gasket having a third leakproof seal between the top surface and the lower rim and a fourth leakproof seal between the first inner surface and the second outer surface.

In one embodiment, a removable feeding utensil press fit in a feeding utensil insert located on the second lid is provided, the feeding utensil insert having a plurality of vertical ridges to secure the removable feeding utensil in place. In one embodiment, the removable feeding utensil is a spoon and a fork combination. In another embodiment, the first lid member includes a recessed portion forming a lip. In one embodiment, the latch member includes a raised edge configured to snap on the lip. In one embodiment, the chambered storage insert is removable and configured to store and transport at least two types of foods and/or liquids. In another embodiment, the first hinge member is positioned on the back side and the first hinge member includes a first bar. In one embodiment, the first lid member includes a first plurality of hinge hooks and the second lid member includes a second plurality of hinge hooks, wherein both the first and second pluralities of hinge hooks are configured to hook around the first bar. In yet another embodiment, the second hinge member includes a second bar and the latch member includes a hooked portion configured to hook around the second bar. In one embodiment, the first lid includes a rounded perimeter surface. In one embodiment, the container has a general oval shape. In one embodiment, a plurality of feet is provided positioned on a bottom side of the body member. In yet another embodiment, the container is constructed of an opaque rigid BPA-free plastic.

In another aspect of the invention, an ergonomic leakproof travel container is provided, comprising a body member having a front side, a back side, and a continuous sidewall having a first outer surface and a first inner surface forming a hollow interior, the continuous sidewall including a first rim adjacent to a top portion of the inner surface, wherein the front side includes an ergonomic concave portion configured to be positioned in a hand of a user during use; an outer lid hingedly attached to the body member via a first hinge member; an inner lid including a flange portion and a lower rim, the flange portion creating a cavity having an inner horizontal surface including at least one rib and an inner vertical surface, wherein the inner lid includes a plurality of holes on the flange portion and the inner lid is independent from the outer lid and hingedly attached to the body member via the first hinge member; a chambered storage insert having a sidewall including a second outer surface, a second inner surface, and a top surface having a slot, the chambered storage insert having at least one divider forming at least two chambers, wherein the chambered storage insert is sized and shaped to press fit in the hollow interior; a latch member attached to a second hinge member on the front side, wherein the latch member is configured to secure the outer and inner lids in a closed position; a first gasket having a first leakproof seal between the first rim and the inner horizontal surface, a second leakproof seal between the first inner surface and the inner vertical surface, and a third leakproof seal between the first rim and the at least one rib, wherein the first gasket includes a plurality of locking caps positioned through the plurality of holes configured to hold the first gasket in place as well as to prevent the first gasket from sticking to the body member when the first and second lid are in an opened position; and a second gasket having a second rim, the second rim inserted into the slot, wherein the second gasket creates a fourth leakproof seal between the top surface and the lower rim and a fifth leakproof seal between the first inner surface and the second outer surface.

In one embodiment, a removable feeding utensil press fit in a feeding utensil insert located on the inner lid is provided, the feeding utensil insert having a plurality of vertical ridges to secure the removable feeding utensil in place. In one embodiment, a plurality of feet positioned on a bottom side of the body member is provided. In another embodiment, the plurality of feet, the body member, the outer lid, and the inner lid act as a counterbalance such that when the outer and inner lid are in a fully extended and open position the container is balanced in an upright position and the container is prevented from tipping when on a flat surface. In yet another embodiment, the second gasket is combined with the chambered storage insert by overmolding. In one embodiment, the chambered storage insert is removable and configured to store and transport at least two types of foods and/or liquids.

BRIEF DESCRIPTION OF THE SEVERAL VIEWS OF THE DRAWINGS

Other features and advantages of the present invention will become apparent when the following detailed description is read in conjunction with the accompanying drawings, in which:

FIGS. 1A-C are various perspective views of an ergonomic leakproof travel container according to an embodiment of the present invention.

FIG. 2 is a perspective view of the ergonomic leakproof travel container with the outer lid in an open position according to an embodiment of the present invention.

FIGS. 3A-C are various perspective views of a chambered storage insert of the ergonomic leakproof travel container according to an embodiment of the present invention.

FIG. 6 is a detailed view of the ergonomic leakproof travel container according to an embodiment of the present invention.

FIG. 7 is a detailed view of a bottom side of the ergonomic leakproof travel container according to an embodiment of the present invention.

DETAILED DESCRIPTION OF THE PREFERRED EMBODIMENT

Figure 3B:
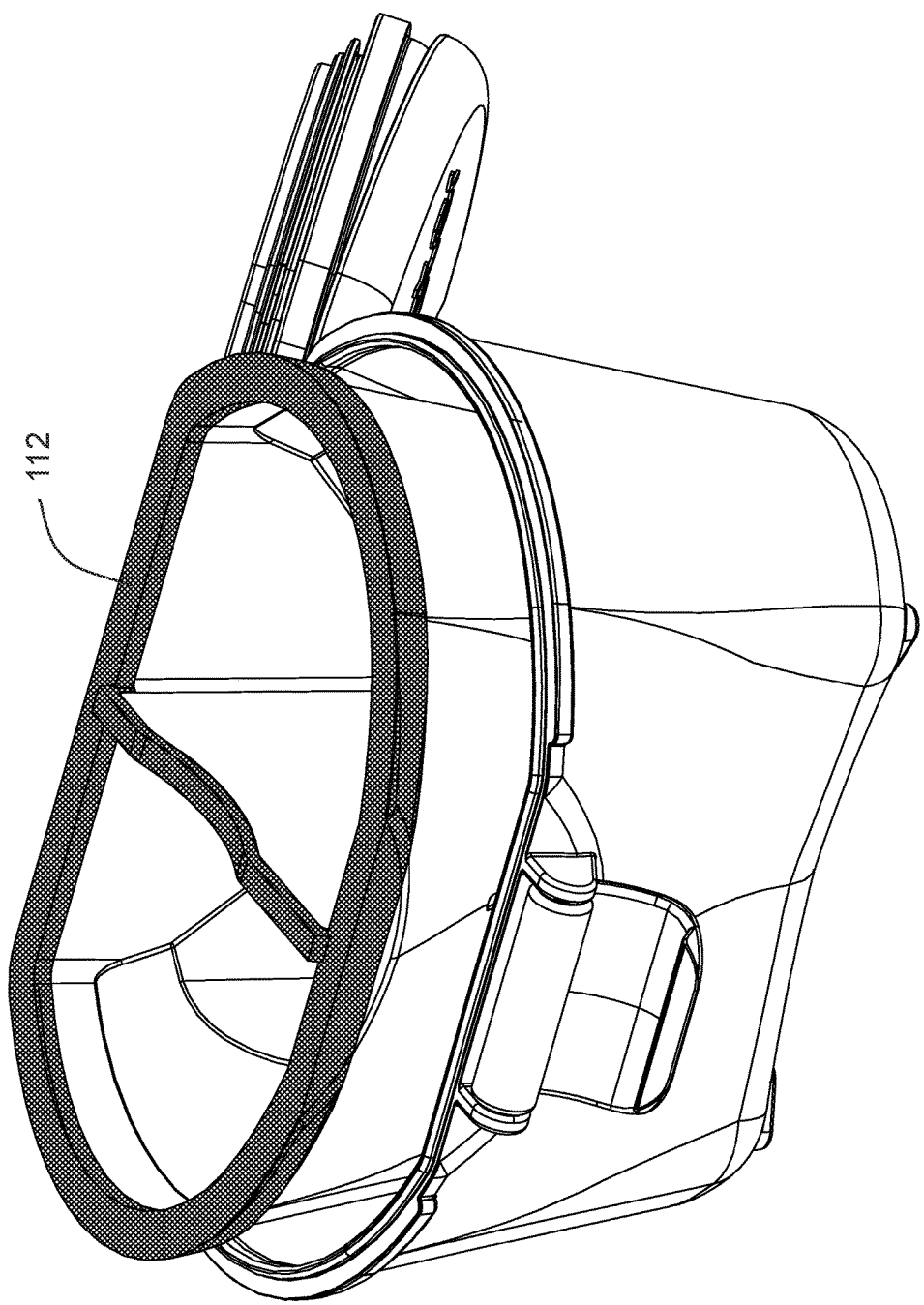

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide an ergonomic leakproof travel container.

FIGS. 1A-C are various perspective views of an ergonomic leakproof travel container 100 according to an embodiment of the present invention. Referring now to FIGS. 1A-C, the leakproof travel container comprises a body member 101 and an outer lid 102 hingedly attached to the body member via hinge member 104. In one embodiment, the body member has a continuous side wall having a general oval shape. In one embodiment, an ergonomic concave portion 101A situated on the front side of the body member is configured to be positioned in a hand of a user during use, preferably the palm of the hand. This is a particular advantage of the present invention as it conveniently allows the user to utilize the one-handing feeding method as previously discussed. In one embodiment, the outer lid has a rounded perimeter edge 102A. In one embodiment, the body member includes a plurality of feet 105 on a bottom surface of the body member to aid in traction when the container is placed on a surface, such as a table or counter. A latch member 103 is attached to the body member and secures the outer lid in a closed position as illustrated. The latch member will be discussed in greater detail below.

FIG. 2 is a perspective view of the ergonomic leakproof travel container with the outer lid in an open position according to an embodiment of the present invention. Referring now to FIG. 2, as illustrated, the outer lid and latch member are in an open position revealing an inner lid 106. Similarly to the outer lid, the inner lid is hingedly attached to the body member via hinge member 104. The hinge member comprises a first bar 126 (FIG. 4B) structurally attached to the back side of the body member. The outer lid comprises a first plurality of hinge hooks 104A, and the inner lid comprises a second plurality of hinge hooks 104B, wherein both the first and second pluralities of hinge hooks are configured to hook around the first bar. This allows independent action between the outer and inner lid utilizing a single hinge member.

Still referring to FIG. 2, the inner lid comprises a flange portion 106A having a plurality of holes 109 spaced circumferenly around the flange portion. In one embodiment, a removable feeding utensil 107, such as a spoon, fork, or spark, is press fit in a feeding utensil insert 108 located on the top surface of the inner lid. Specially, the feeding utensil insert includes a plurality of vertical ridges 108A (FIG. 6) to secure the removable feeding utensil in place. The feeding utensil insert is shaped like the removable feeding utensil. A first gasket 110 (FIG. 3A) comprises a plurality of locking caps 111 positioned through the plurality of holes configured to hold the first gasket in place as well as to prevent the first gasket from sticking to the body member when the inner and outer lid are in an opened position. The first gasket will be discussed in greater detail below.

Figure 3C:
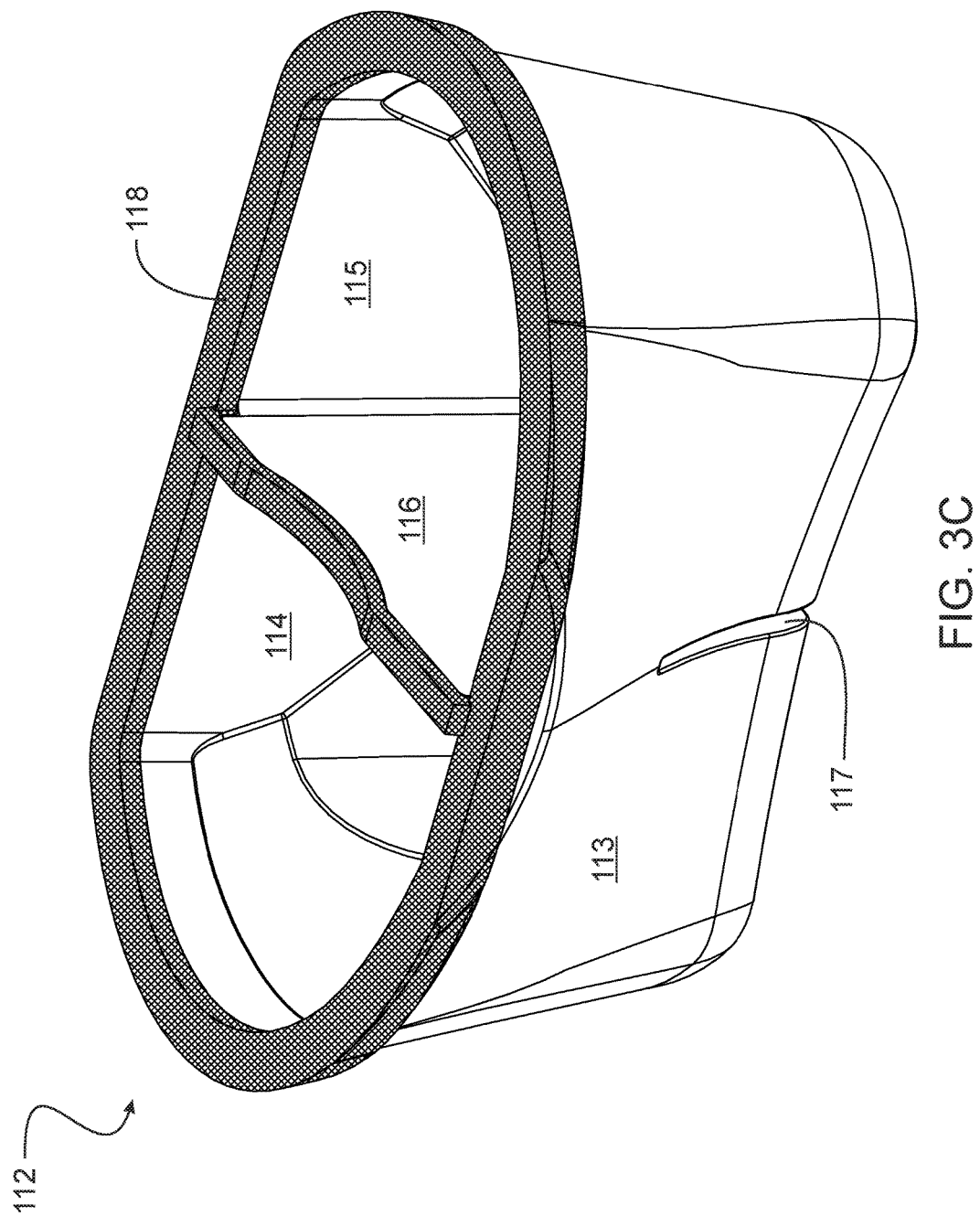

FIGS. 3A-C are various perspective views of a chambered storage insert 112 of the ergonomic leakproof travel container according to an embodiment of the present invention. Referring now to FIGS. 3A-C, the chambered storage insert is reveled when the outer and inner lids are in an opened position. The chambered storage insert is removable and configured to store and transport at least two types of foods and/or liquids depending on the internal configurations. For instance, as illustrated the chambered storage insert comprises a divider 116 separating the chambered storage insert into a first and second storage chamber 114 and 115 respectively. In one embodiment, the divider includes space 117 further separating the first and second storage chambers, this helps insulate the chambers from each other which is especially beneficial when hot and cold food items are stored in respective containers. It should be understood, in alternative embodiments, multiple dividers may be present permitting more storage chambers. As illustrated, the chambered storage insert comprises a body wall 113 sized and shaped to press fit into the body member. A second gasket 118 fit in the body wall is provided, and will be discussed in greater detail below.

Figure 4A:
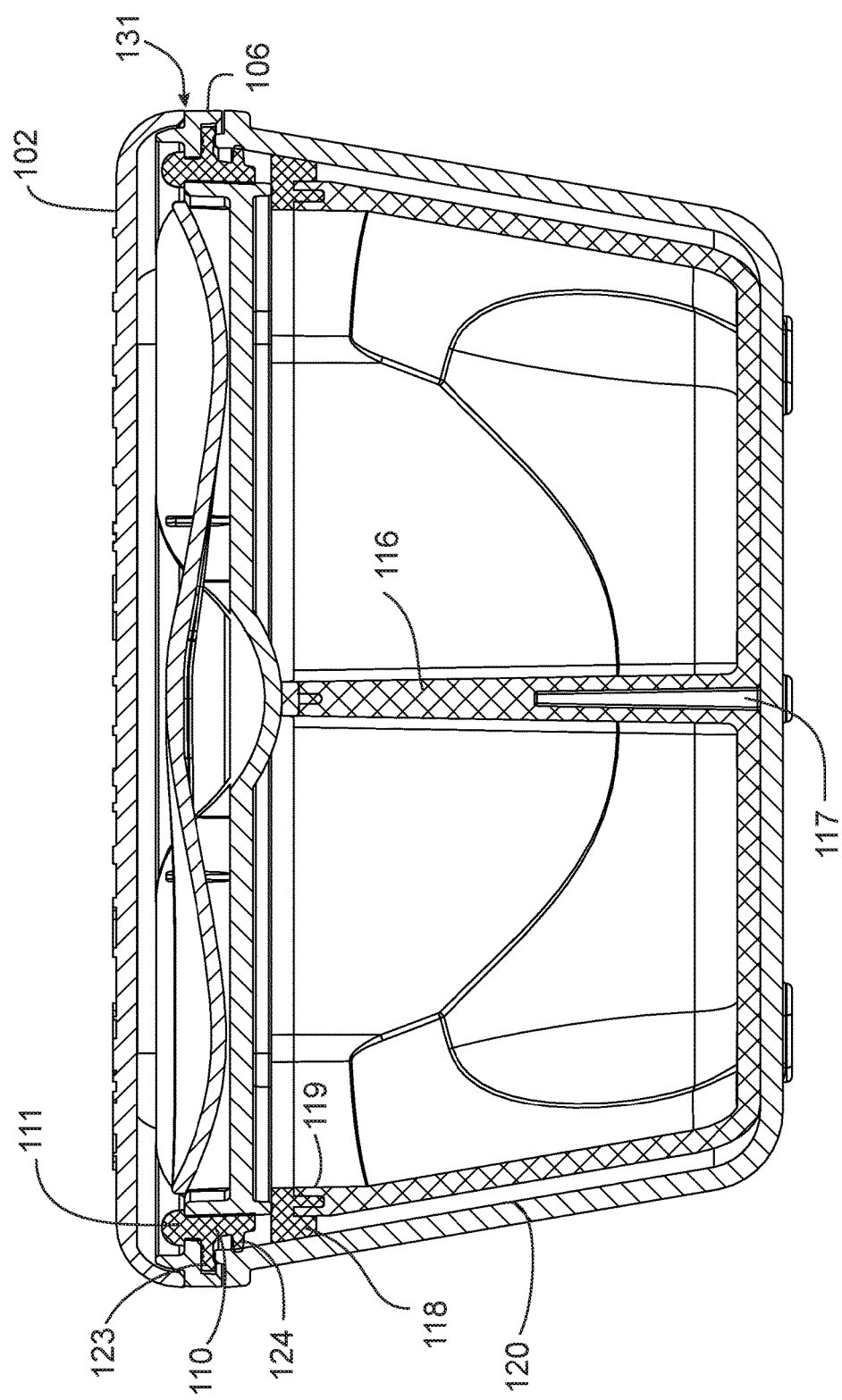
FIG. 4A is a front section view of the ergonomic leakproof travel container according to an embodiment of the present invention.
Figure 4B:
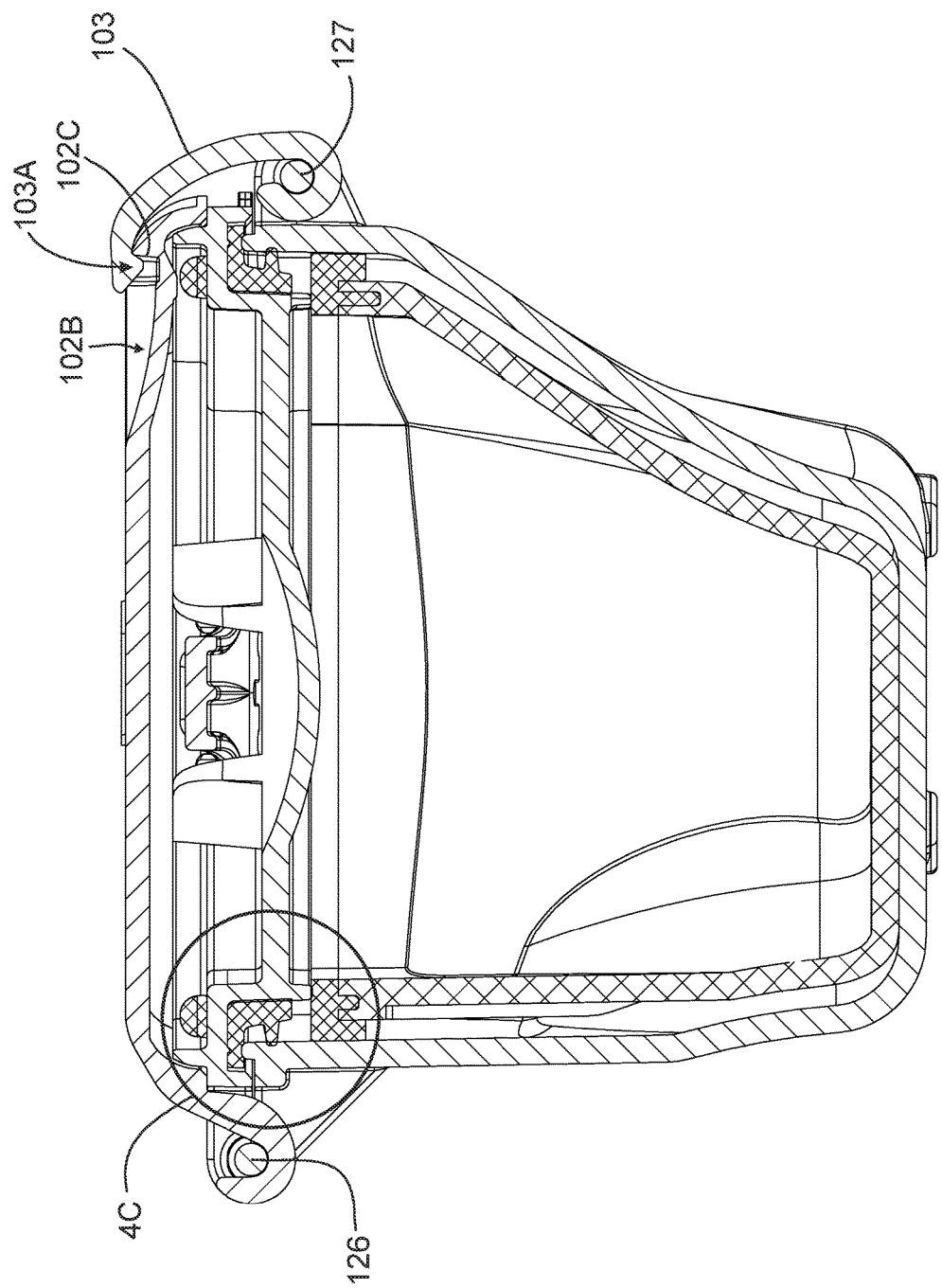
FIG. 4B is a side section view of the ergonomic leakproof travel container according to an embodiment of the present invention.
Figure 4C:
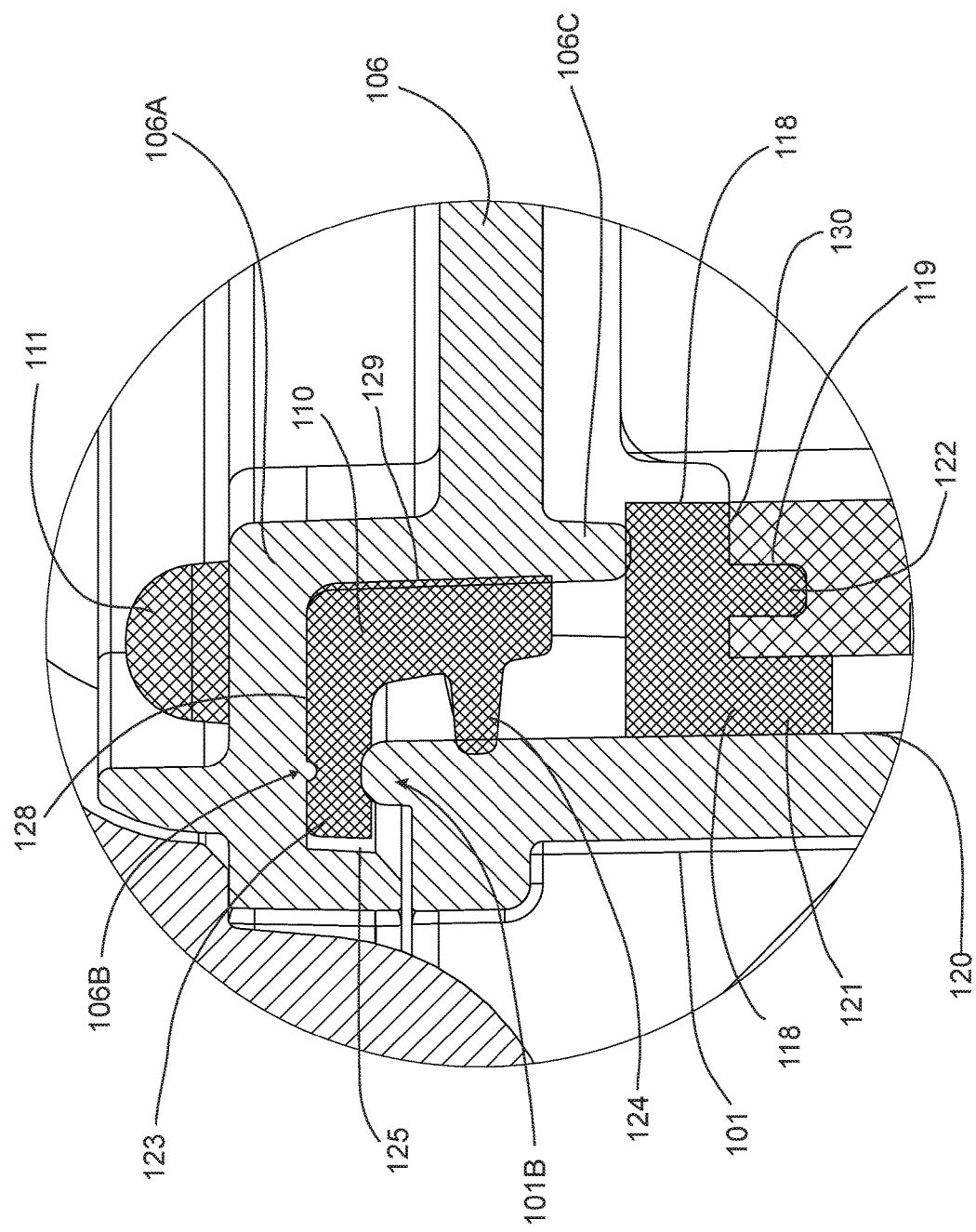
FIG. 4C is a detailed view of FIG. 4B

FIGS. 4A-C are various section and detail views of the ergonomic leakproof travel container according to an embodiment of the present invention. FIG. 4A is a front section view of the ergonomic leakproof travel container. Referring to FIG. 4A, divider 116 and space 117 can be clearly seen. Also in this view, it can be seen that when outer lid 102 is in a closed position, a portion of the outer lid is pressed against inner lid 106 at pressure point 131. As previously mentioned the latch member secures the outer lid in a closed position. When the latch is secure, the outer lid is pressed against inner lid generating two leakproof seals with the first and second gaskets 110 and 118. Further details of the latch and gaskets will be discussed in greater detail below.

FIG. 4B is a side section view of the ergonomic leakproof travel container. Referring now to FIG. 4B, the details of the latch member are illustrated. Specifically, latch member 103 is rotatable around second bar 127, and includes a raised edge 103A configured to snap on lip 102C formed by recessed portion 102B located in the outer lid.

FIG. 4C is a detailed view of FIG. 4B. Referring now to FIG. 4C, the details of the first and second gasket are provided. The first gasket comprises a first protrusion 123 and second protrusion 124. The first gasket provides a first leakproof seal between rim 101B and an inner horizontal surface 128 via the first protrusion, a second leakproof seal between inner surface 120 and inner vertical surface 129 via the second protrusion, and a third leakproof seal between the rim and rib 106B. The shape and construction of flange 106A of the inner lid creates cavity 125 having the inner horizontal and inner vertical surfaces. The rib located on the underside of the flange on the inner horizontal surface helps compress the first gasket against the rim of the body member. In a preferred embodiment, one rib is provided, however it is understood that more than one rib may be provided to add pressure on the first gasket between the rim of the body member. As previously mentioned, the first gasket further comprises a plurality of locking caps 111 positioned through the plurality of holes configured to hold the first gasket in place as well as to prevent the first gasket from sticking to the body member when the first and second lid are in an opened position.

The second gasket comprises a third protrusion 121 and fourth protrusion 122. The second gasket provides a fourth leakproof seal between a top surface 130 of the body wall of the chambered storage insert and a lower rim 106C of the inner lid, and a fifth leakproof seal between inner surface 120 and the outer surface of the body wall of chambered storage insert via the third protrusion. The fourth protrusion is inserted into slot 119 located on the top surface of the body wall of the chambered storage insert, this keeps the second gasket in place when the chambered storage insert is removed from the body member during use. In one embodiment, the second gasket is combined with the chambered storage insert via overmolding.

In one embodiment, all the structural components of the invention are constructed from a rigid BPA-free plastic. In a preferred embodiment, the rigid BPA-free plastic is a food grade copolyester plastic, such as Tritan® from Eastman Chemical. In one embodiment, all the structural components of the invention are constructed from a rigid EA-free plastic. In one embodiment, the structural components have a translucent polished finish in a 10% color saturation. In one embodiment, the structural components are opaque, including 100% opacity. In one embodiment, the structural components are transparent. In one embodiment, the first and second gaskets are constructed from a food-grade silicone. In one embodiment, the first and second gaskets are made from a thermoplastic elastomer (TPE). A variety of colors may be used, but since the intended use is for feeding infants and small children a pink or blue shade is preferred.

Figure 5:
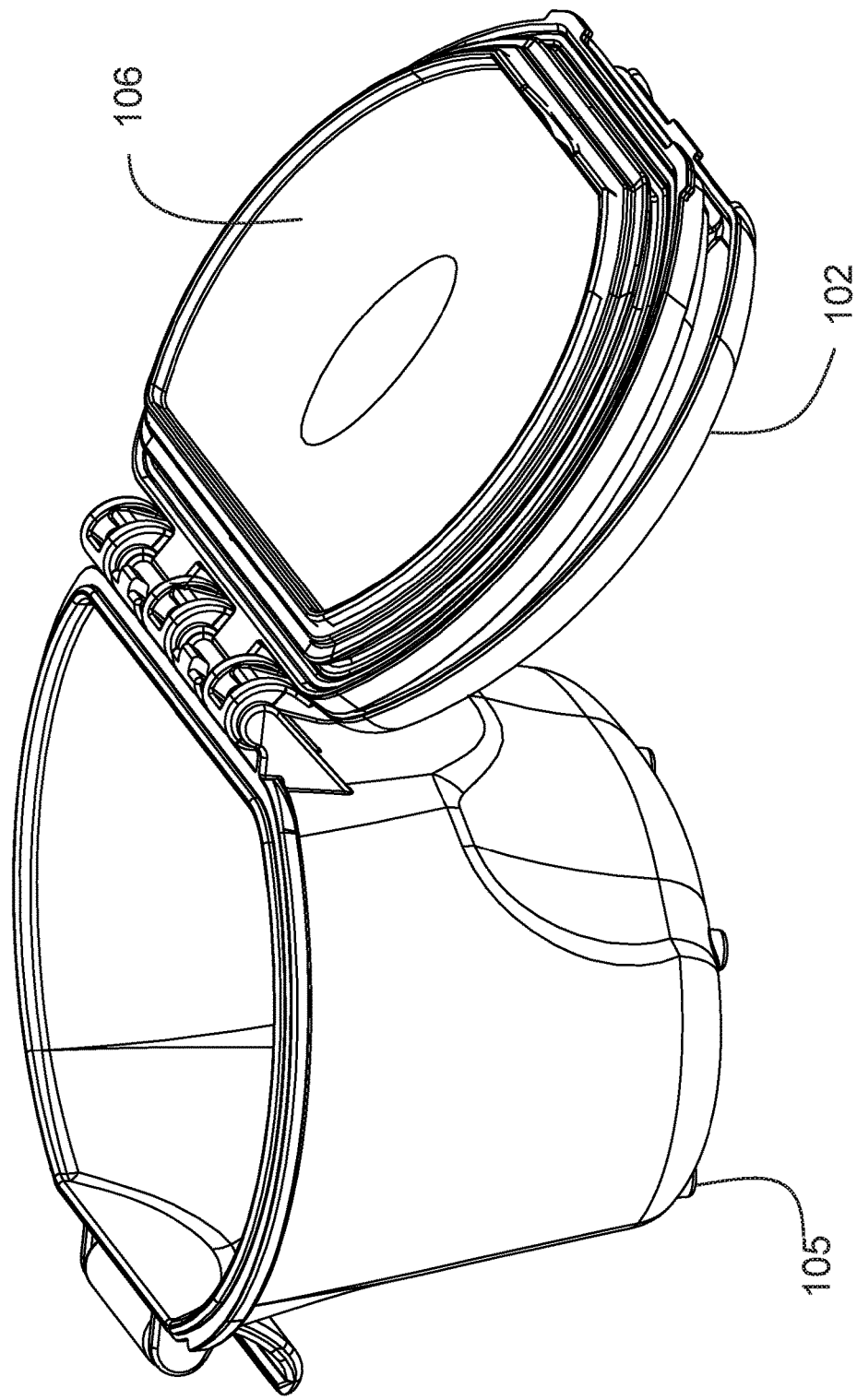
FIG. 5 is a perspective view of the ergonomic leakproof travel container with both the inner and outer lid in an open position according to an embodiment of the present invention.

FIG. 5 is a perspective view of the ergonomic leakproof travel container with both the inner and outer lid in an open position according to an embodiment of the present invention. Referring now to FIG. 5, both the inner and outer lid is in a completely open position. This is a particular advantage of the present invention, as in this position when the lids are completely open and extended backwards touching a surface (not illustrated) the container is resting on, the lids act as a counterbalance keeping the container upright. The positioned and angle of the plurality of feet (outward in the front portion 105A; FIG. 7) acts in conjunction with the lids preventing the container from tipping when on a flat surface. This allows a user to use the container and removable utensil to remove any stored food as well as placing the removable utensil inside the container without the container tipping over.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are used to show a serial or numerical limitation but instead are used to distinguish or identify the various members of the group.

What is claimed is:

1. An ergonomic leakproof travel container comprising:
a body member having a front side, a back side, and a continuous sidewall having no right angles, wherein the continuous sidewall has an outer surface and inner surface forming a hollow interior;
a first lid member hingedly attached to the body member via a first hinge member;
a second lid member independent from the first lid member, wherein the second lid member is hingedly attached to the body member via the first hinge member;
a chambered storage insert sized and shaped to fit in the hollow interior;
a latch member attached to a second hinge member on the front side, wherein the latch member is configured to secure the first lid and second lid in a closed position;
a first gasket positioned between the body member and the second lid creating a first leakproof seal; and
a second gasket positioned h the chambered storage insert and the second lid creating a second leakproof seal.

2. An ergonomic leakproof travel container comprising:
a body member having a front side, a back side, and a continuous sidewall having a first outer surface and a first inner surface forming a hollow interior, the continuous sidewall including a rim adjacent to a top portion of the inner surface, wherein the front side includes an ergonomic concave portion configured to be positioned in a hand of a user during use;
a first lid member hingedly attached to the body member via a first hinge member;
a second lid member including a flange portion and a lower rim; the flange portion creating a cavity having an inner horizontal surface and an inner vertical surface, wherein the second lid member is independent from the first lid member and hingedly attached to the body, member via the first hinge member;
a chambered storage insert having a second continuous sidewall including a second outer surface, a second inner surface, and a top surface; the chambered storage insert having at least one divider forming at least two chambers, wherein the chambered storage insert is sized and shaped to press fit in the hollow interior;
a latch member attached to a second hinge member on the front side, wherein the latch member is configured to secure the first lid and second lid in a closed position;
a first gasket having a first leakproof seal between the rim and the inner horizontal surface and a second leakproof seal between the first inner surface and the inner vertical surface; and
a second gasket having a third leakproof seal between the top surface and the lower rim and a fourth leakproof seal between the first inner surface and the second outer surface.

3. The container of claim 2, further comprising a removable feeding utensil press fit in a feeding utensil insert located on the second lid, the feeding utensil insert having a plurality of vertical ridges to secure the removable feeding utensil in place.

4. The container of claim 3, wherein the removable feeding utensil is a spoon and a fork combination.

5. The container of claim 2; wherein the first lid member includes a recessed portion forming a lip.

6. The container of claim 5, wherein the latch member includes a raised edge configured to snap on the lip.

7. The container of claim 2, wherein the chambered storage insert is removable and configured to store and transport at least two types of foods and/or liquids.

8. The container of claim 2, wherein the first hinge member is positioned on the back side and the first hinge member includes a first bar.

9. The container of claim 8, wherein the first lid member includes a first plurality of hinge hooks and the second lid member includes a second plurality of hinge hooks, wherein both the first and second pluralities of hinge hooks are configured to hook around the first bar.

10. The container of claim 9, wherein the second hinge member includes a second bar and the latch member includes a hooked portion configured to hook around the second bar.

11. The container of claim 2, wherein the first lid includes a rounded perimeter surface.

12. The container of claim 2, wherein the container has a general oval shape.

13. The container of claim 2, further comprising a plurality of feet positioned on a bottom side of the body member.

14. The container of claim 2, wherein the container is constructed of an opaque rigid BPA-free plastic.

15. An ergonomic leakproof travel container comprising:
a body member having a front side, a back side, and a continuous sidewall having a first outer surface and a first inner surface forming a hollow interior, the continuous sidewall including a first rim adjacent to a top portion of the inner surface, wherein the front side includes an ergonomic concave portion configured to be positioned in a hand of a user during use;
an outer id hingedly attached to the body member via first hinge member;
an inner lid including a flange portion and a lower rim, the flange portion creating a cavity having an inner horizontal surface including at least one rib and an inner vertical surface, wherein the inner lid includes a plurality of holes on the flange portion and the inner lid is independent from the outer lid and hingedly attached to the body member via the first hinge member;
a chambered storage insert having a sidewall including a second outer surface, a second inner surface, and a top surface having a slot, the chambered storage insert having at least one divider forming at least two chambers, wherein the chambered storage insert is sized and shaped to press fit in the hollow interior;
a latch member attached to a second hinge member on the front side, wherein the latch member is configured to secure the outer and inner lids in a closed position;
a first gasket having a first leakproof seal between the first rim and the inner horizontal surface, a second leakproof seal between the first inner surface and the inner vertical surface, and a third leakproof seal between the first rim and the at least one rib, wherein the first gasket includes a plurality of locking caps positioned through the plurality of holes configured to hold the first gasket in place as well as to prevent the first gasket from sticking to the body member when the first and second lid are in an opened position; and
a second gasket having a second rim, the second rim inserted into the slot, wherein the second gasket creates a fourth leakproof seal between the top surface and the lower rim and a fifth leakproof seal between the first inner surface and the second outer surface.

16. The container of claim 15, further comprising a removable feeding utensil press fit in a feeding utensil insert located on the inner lid, the feeding utensil insert having a plurality of vertical ridges to secure the removable feeding utensil in place.

17. The container of claim 15, further comprising a plurality of feet positioned on a bottom side of the body member.

18. The container of claim 17, wherein the plurality of feet, the body member, the outer lid, and the inner lid act as a counterbalance such that when the outer and inner lid are in a fully extended and open position the container is balanced in an upright position and the container is prevented from tipping when on a flat surface.

19. The container of claim 15, wherein the second gasket is combined with the chambered storage insert by overmolding.

20. The container of claim 15, wherein the chambered storage insert is removable and configured to store and transport at least two types of foods and/or liquids.

* * * * *